United States Patent
Choi et al.

(10) Patent No.: US 12,050,992 B2
(45) Date of Patent: Jul. 30, 2024

(54) METHOD FOR COMPENSATING FOR PROCESS VARIATION BY MEANS OF ACTIVATION VALUE ADJUSTMENT IN ANALOG BINARIZED NEURAL NETWORK CIRCUIT, AND SYSTEM THEREFOR

(71) Applicants: SEOUL NATIONAL UNIVERSITY R&DB FOUNDATION, Seoul (KR); KOREA INSTITUTE OF SCIENCE AND TECHNOLOGY, Seoul (KR)

(72) Inventors: Ki Young Choi, Seoul (KR); Jae Hyun Kim, Incheon (KR); Chae Un Lee, Seoul (KR); Joonyeon Chang, Seoul (KR); Joon Young Kwak, Seoul (KR); Jaewook Kim, Seoul (KR)

(73) Assignees: SEOUL NATIONAL UNIVERSITY R&DB FOUNDATION, Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 1014 days.

(21) Appl. No.: 16/971,917

(22) PCT Filed: Dec. 31, 2019

(86) PCT No.: PCT/KR2019/018803
§ 371 (c)(1),
(2) Date: Aug. 21, 2020

(87) PCT Pub. No.: WO2020/141858
PCT Pub. Date: Jul. 9, 2020

(65) Prior Publication Data
US 2021/0089893 A1    Mar. 25, 2021

(30) Foreign Application Priority Data
Dec. 31, 2018  (KR) .......................... 10-2018-0174232

(51) Int. Cl.
*G06N 3/08* (2023.01)
*G06F 17/18* (2006.01)
(Continued)

(52) U.S. Cl.
CPC ............... *G06N 3/08* (2013.01); *G06F 17/18* (2013.01); *G06N 3/048* (2023.01); *G06N 3/065* (2023.01)

(58) Field of Classification Search
CPC .......... G06N 3/08; G06N 3/048; G06N 3/065; G06N 3/045; G06N 3/04; G06F 17/18
See application file for complete search history.

(56) References Cited

U.S. PATENT DOCUMENTS 5,566,092 A * 10/1996 Wang ................. G05B 19/4184
706/912
11,170,289 B1 * 11/2021 Duong .................. G06N 3/048
(Continued)

FOREIGN PATENT DOCUMENTS

KR       2014-0120287 A    10/2014

OTHER PUBLICATIONS

Yonekawa H, Nakahara H. On-chip memory based binarized convolutional deep neural network applying batch normalization free technique on an FPGA. In2017 IEEE International Parallel and Distributed Processing Symposium Workshops (IPDPSW) May 29, 2017 (pp. 98-105). IEEE. (Year: 2017).*
(Continued)

*Primary Examiner* — Oluwatosin Alabi
(74) *Attorney, Agent, or Firm* — Kilpatrick Townsend & Stockton LLP

(57) ABSTRACT

An embodiment of the present disclosure discloses a method of process variation compensating through activation value adjustment of an analog binarized neural network circuit that may recover a decrease in recognition rate performance up
(Continued)

to an almost perfect level, even if a binarized neural network is implemented as an analog circuit such that recognition rate performance is decreased due to process variation.

9 Claims, 9 Drawing Sheets

(51) Int. Cl.
 *G06N 3/048* (2023.01)
 *G06N 3/065* (2023.01)

(56) References Cited

U.S. PATENT DOCUMENTS

| | | | |
|---|---|---|---|
| 2020/0202223 A1* | 6/2020 | Strauss | G06N 3/123 |
| 2020/0218964 A1* | 7/2020 | Nakahara | G06N 3/08 |

OTHER PUBLICATIONS

Liang S, Yin S, Liu L, Luk W, Wei S. FP-BNN: Binarized neural network on FPGA. Neurocomputing. Jan. 31, 2018;275:1072-86. (Year: 2018).*

Miyashita D, Kousai S, Suzuki T, Deguchi J. A neuromorphic chip optimized for deep learning and CMOS technology with time-domain analog and digital mixed-signal processing. IEEE Journal of Solid-State Circuits. Jun. 27, 2017;52(10):2679-89. (Year: 2017).*

International Search Report and Written Opinion mailed Apr. 10, 2020 in International Patent Application No. PCT/KR2019/018803, filed Dec. 31, 2019, 11 pages.

Courbariaux, M., et al. "Binarized Neural Networks: Training Deep Neural Networks with Weights and Activations Constrained to +1 or −1", Technion—Israel Institute of Technology, Columbia University, Mar. 17, 2016, 11 pages, DOI:arXiv:1602.02830v3 [cs.LG].

Jia, K., et al., "Calibrating Process Variation at System Level with In-Situ Low-Precision Transfer Learning for Analog Neural Network Processors," 2018 55th ACM/ESDA/IEEE Design Automation Conference (DAC), San Francisco, CA, 2018, 7 pages, doi:10.1109/DAC.2018.8465796.

Rastegari, M. et al. "XNOR-Net: ImageNet Classification Using Binary Convolutional Neural Networks", ArXiv abs/1603.05279 (year 2016), p. 525-542, DOI:10.1007/978-3-319-46493-0 32.

Geman, S.,et al. "Neural Networks and the Bias/Variance Dilemma", Neural Computation, 4 (1992): p. 1-58, DOI:10.1162/neco.1992.4.1.1.

Written Decision on Registration mailed May 27, 2019 in Korean Patent Application No. 20180174232 filed Dec. 31, 2018, 5 pages.

\* cited by examiner

Algorithm 1 Variation compensation through activation matching (VCAM):

---

Input: a sample chip $C$, input images $I$ in a training set, # of layers $L$ in a network, and average activation values of neurons for $L$ layers $A_T^1, A_T^2, \ldots, A_T^L$ over input images $I$ in the ideal case.

Output: a sample chip $C$ with restored accuracy after bias tuning.

1: for $l \leftarrow 1$ to $L$ do
2:     $M^l \leftarrow$ maximum possible bias value
3:     $step \leftarrow 2^{\lceil \log_2 M^l \rceil - 1}$
4:     while $step > 0$ do
5:        $A^l \leftarrow$ Compute_average_activation($C, l, I$)
6:        $\Delta A^l \leftarrow A^l - A_T^l$
7:        $B^l \leftarrow B^l - \text{Sign}(\Delta A^l) \cdot step$
8:        Reprogram_ReRAM($C, B^l$)
9:        $step \leftarrow step/2$

METHOD FOR COMPENSATING FOR PROCESS VARIATION BY MEANS OF ACTIVATION VALUE ADJUSTMENT IN ANALOG BINARIZED NEURAL NETWORK CIRCUIT, AND SYSTEM THEREFOR

TECHNICAL FIELD

The present disclosure relates to method and system for compensating for process variation through activation value adjustment of an analog binarized neural network circuit, and more particularly, to a method and system for compensating for process variation, which prevent a recognition rate performance from decreasing due to process variation occurring when a binarized neural network is implanted into an analog circuit.

BACKGROUND ART

Recently, various types of analog circuits have been proposed for implementing a low-power artificial neural network. However, an analog circuit is very vulnerable to process variation due to characteristics thereof, and thus, there is a problem in that a recognition rate performance is greatly reduced after the previously implemented artificial neural network is actually fabricated as a semiconductor chip, Among artificial neural networks, a binarized neural network (BNN) refers to an artificial neural network having a 1-bit synaptic weight and a 1-bit activation value. This is because, since the weight and activity is small as compared to existing artificial neural networks, there is a low demand for weight storage, and an arithmetic unit may be simply designed, and thus, there is an advantage in that the binarized neural network may be implemented with low power in a relatively small area as compared with existing artificial neural networks.

A neuron, which is a basic element constituting a binarized neural network, may be implemented by a digital circuit or an analog circuit, and the analog circuit has the advantage of being able to be implemented with a much smaller area than the digital circuit and with lower power, while there is a problem in that a recognition rate performance is greatly decreased due to process dispersion, as side effects due to process variation that inevitably occurs after the analog circuit is actually implanted into a semiconductor chip as described above.

Therefore, there is a need for a method of minimizing the side effects due to the process variation occurring when an artificial neural network is actually implanted into a semiconductor chip, and in the past, there has been proposed a method in which a weight is internally adjusted through an additional learning process by directly inserting a learning system into a semiconductor chip, but a method of adding an independent arithmetic circuit to a semiconductor chip has a great side effect in which overhead is generated in a circuit.

DESCRIPTION OF EMBODIMENTS

Technical Problem

The present disclosure provides a process variation compensating method of minimizing a decrease in a recognition rate performance due to process variation occurring when a binarized neural network is implemented by an analog circuit, and a compensating system for implementing the method.

Solution to Problem

According to an embodiment of the present disclosure, a process variation compensating method through activation value adjustment of an analog binarized neural network (BNN) circuit, includes an initialization step of initializing a synaptic weight and a bias of neurons constituting the binarized neural network; an average activation value measurement step of receiving training data and measuring an average activation value obtained by quantifying how much active output is output from the neurons constituting the binarized neural network for a preset time; a deviation value calculation step of calculating a value of deviation between the measured average activation value and a reference average activation value; a tendency grasping step of changing the initialized bias at least once and grasping a tendency for the calculated deviation value to be gradually decreased according to a direction in which the bias is changed; and a monotone increasing and decreasing step of monotonically increasing or monotonically decreasing the bias of the neurons constituting the binarized neural network until the calculated deviation value becomes less than a preset reference deviation based on the grasped tendency.

According to an embodiment of the present disclosure, a process variation compensating system through activation value adjustment of an analog binarized neural network (BNN) circuit, includes an initialization unit that initializes a synaptic weight and a bias of neurons constituting the binarized neural network; an average activation value measurement unit that receives training data and measures an average activation value obtained by quantifying how much active output is output from the neurons constituting the binarized neural network for a preset time; a deviation value calculation unit that calculates a value of deviation between the measured average activation value and a reference average activation value; a tendency grasping unit that changes the initialized bias at least once and grasps a tendency for the calculated deviation value to be gradually decreased according to a direction in which the bias is changed; and a monotone increasing and decreasing unit that monotonically increases or monotonically decreases the bias of the neurons constituting the binarized neural network until the calculated deviation value becomes less than a preset reference deviation based on the grasped tendency.

An embodiment of the present disclosure may provide a computer-readable recording medium storing a program for performing the method.

Advantageous Effects of Disclosure

According to the present disclosure, although a binarized neural network is implemented as an analog circuit to cause a recognition rate performance to be decreased due to process variation, the decrease in recognition rate performance may be recovered up to an almost perfect level.

In addition, the present disclosure has versatility applicable to an analog circuit designed in various ways regardless of one specific design method.

BRIEF DESCRIPTION OF DRAWINGS

FIG. 3 is a diagram illustrating process in which a monotone increasing and decreasing unit monotonically increases or monotonically decreases a bias of a neuron with an algorithm based on a binary search;

BEST MODE

Figure 1:
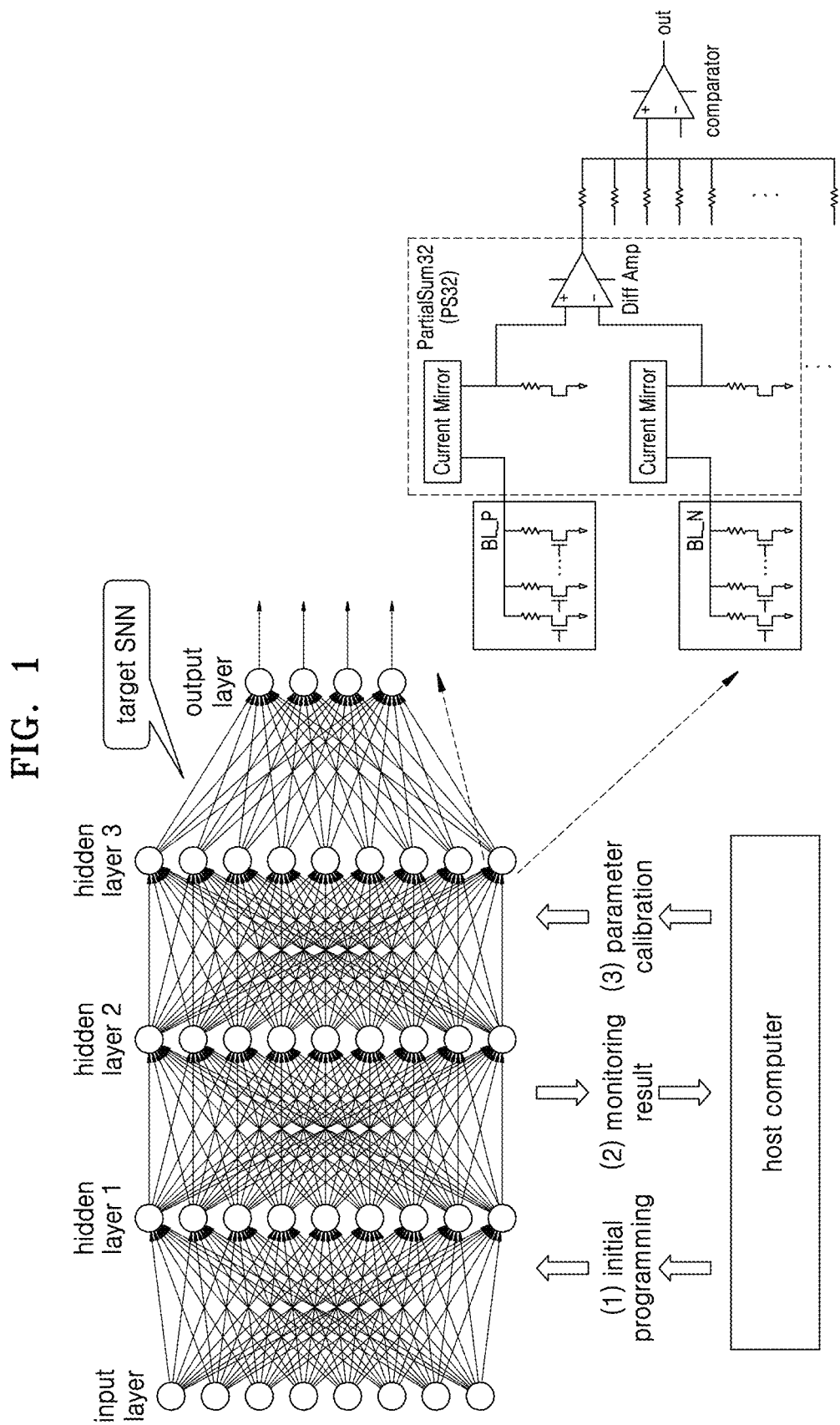
FIG. 1 is a diagram schematically illustrating an overall system according to the present disclosure.

According to an embodiment of the present disclosure, a process variation compensating method through activation value adjustment of an analog binarized neural network (BNN) circuit, includes an initialization step of initializing a synaptic weight and a bias of neurons constituting the binarized neural network; an average activation value measurement step of receiving training data and measuring an average activation value obtained by quantifying how much active output is output from the neurons constituting the binarized neural network for a preset time; a deviation value calculation step of calculating a value of deviation between the measured average activation value and a reference average activation value; a tendency grasping step of changing the initialized bias at least once and grasping a tendency for the calculated deviation value to be gradually decreased according to a direction in which the bias is changed; and a monotone increasing and decreasing step of monotonically increasing or monotonically decreasing the bias of the neurons constituting the binarized neural network until the calculated deviation value becomes less than a preset reference deviation based on the grasped tendency.

In the method, the bias may be initialized by automated test equipment (ATE) outside the binarized neural network circuit, in the initialization step.

In the method, the training data may be data used to train the binarized neural network before being implanted into the circuit.

In the method, the bias may be monotonically increased or monotonically decreased by repeating a binary search method, in the monotone increasing and decreasing step.

In the method, the binarized neural network may be composed of an input layer, a hidden layer, and an output layer that include a plurality of neurons, and the average activation value measurement step, the deviation value calculation step, the tendency grasping step, and the monotone increasing and decreasing step may be sequentially performed by distinguishing each of the input layer, the hidden layer, and the output layer.

According to an embodiment of the present disclosure, a process variation compensating system through activation value adjustment of an analog binarized neural network (BNN) circuit, includes an initialization unit that initializes a synaptic weight and a bias of neurons constituting the binarized neural network; an average activation value measurement unit that receives training data and measures an average activation value obtained by quantifying how much active output is output from the neurons constituting the binarized neural network for a preset time; a deviation value calculation unit that calculates a value of deviation between the measured average activation value and a reference average activation value; a tendency grasping unit that changes the initialized bias at least once and grasps a tendency for the calculated deviation value to be gradually decreased according to a direction in which the bias is changed; and a monotone increasing and decreasing unit that monotonically increases or monotonically decreases the bias of the neurons constituting the binarized neural network until the calculated deviation value becomes less than a preset reference deviation based on the grasped tendency.

In the system, the initialization unit may initialize the bias by using automated test equipment (ATE) outside the binarized neural network circuit.

In the system, the training data may be data used to train the binarized neural network before being implanted into the circuit.

In the system, the monotone increasing and decreasing unit may monotonically increase or monotonically decrease the bias by repeating a binary search method.

In the system, the binarized neural network may be composed of an input layer, a hidden layer, and an output layer that include a plurality of neurons, and the average activation value measurement unit may receive training data and measure a first average activation value from the neurons configuring the input layer, the deviation value calculation unit may calculate a first value of deviation between the measured first average activation value and the reference average activation value, the tendency grasping unit may change the bias of the neurons of the input layer at least once to grasp a first tendency in which the calculated first deviation value is gradually decreased, the monotone increasing and decreasing unit may monotonically increase or monotonically decrease the bias of the neurons configuring the input layer until the first deviation value becomes less than the preset reference deviation, based on the grasped first tendency, the average activation value measurement unit may receive the training data and measure a second average activation value from the neurons configuring the hidden layer, the deviation value calculation unit may calculate a second value of deviation between the measured second average activation value and the reference average activation value, the tendency grasping unit may change the bias of the neurons of the input layer at least once and grasps a second tendency in which the calculated second deviation value is gradually decreased, the monotone increasing and decreasing unit may monotonically increase or monotonically decrease the bias of the neurons configuring the hidden layer until the second deviation value becomes less than the preset reference deviation, based on the grasped second tendency, the average activation value measurement unit may receive the training data and measure a third average activation value from the neurons configuring the output layer, the deviation value calculation unit may calculate a third value of deviation between the measured third average activation value and the reference average activation value, the tendency grasping unit may change the bias of the neurons of the output layer at least once and grasps a third tendency in which the calculated third deviation value is gradually decreased, and the monotone increasing and decreasing unit may monotonically increase or monotonically decrease the bias of the neurons configuring the output layer until the third deviation value becomes less than the preset reference deviation, based on the grasped third tendency.

MODE OF DISCLOSURE

The terms used in the embodiments are general terms widely used at present as possible while considering functions of the present disclosure and may change depending on intention of a person skilled in the art, a precedent, emergence of a new technology, and so on. In addition, there is a term randomly selected by the applicant in a certain case, and in this case, meaning of the term will be described in detail in the corresponding description. Accordingly, a term used in the specification should be defined based on the meaning of the term and content throughout the present disclosure, rather than a name of the simple term.

Throughout the specification, when a part is described to "include" a certain configuration element, which means that the part may further include other configuration elements, except to exclude other configuration elements unless otherwise stated. In addition, the term " . . . unit", " . . . module", or the like described in the specification means a unit for processing at least one function or operation, which may be implemented by hardware or software, or a combination of the hardware and the software.

Hereinafter, embodiments of the present disclosure will be described in detail with reference to the accompanying drawings so that those skilled in the art to which the present disclosure belongs may easily implement. However, the present disclosure may be implemented in many different forms and is not limited to the embodiments to be described herein.

Hereinafter, embodiments of the present disclosure will be described in detail with reference to the drawings.

FIG. 1 is a diagram schematically illustrating an overall system according to the present disclosure.

FIG. 1 is a diagram illustrating a configuration of the overall system according to the present disclosure, and a synaptic weight and a bias of each neuron, which configures a binarized neural network by connecting a SoC chip manufactured by constituting a binarized neural network (BNN) using an analog neuron circuit to a SoC chip by using a separate host computer or automated test equipment (ATE), is initialized. At this time, weights and biases of an artificial neural network trained by using a GPU and so on in the computer are used for weights and biases input in an initialization process, and concept of the weights and the biases is the same as the concept commonly used in the artificial neural network, and thus, detailed description thereof will be omitted.

Due to characteristics of an analog circuit that is vulnerable to process variation, the artificial neural network does not operate as intended at the time of initial design after being actually implemented as an analog circuit. Therefore, a compensating (correcting) method thereof is necessary, and the present disclosure may greatly assist in recovering a function of an artificial neural network lost an original function because of an inevitable process variation due to implementation of an analog circuit as described above.

Referring to FIG. 1, a binarized neural network is composed of one input layer, three hidden layers, and one output layer, each layer is composed of a neuron configured with an analog circuit (configured by a differential amplifier, a resistor, the ground, and so on), and the neuron may output 0 or 1 as an output value because the neuron configures a binarized neural network. In FIG. 1, a host computer performs initial programming (initialization) of the binarized neural network, and corresponds to a compensating system according to the present disclosure that provides a compensation function for recovering a decrease in a recognition rate due to process variation while monitoring a value output from the binarized neural network. In FIG. 1, the three hidden layers are only examples for explaining, and it is obvious that the number of layers of the hidden layer of the binarized neural network may not be three in actually applying the present disclosure.

Figure 2:
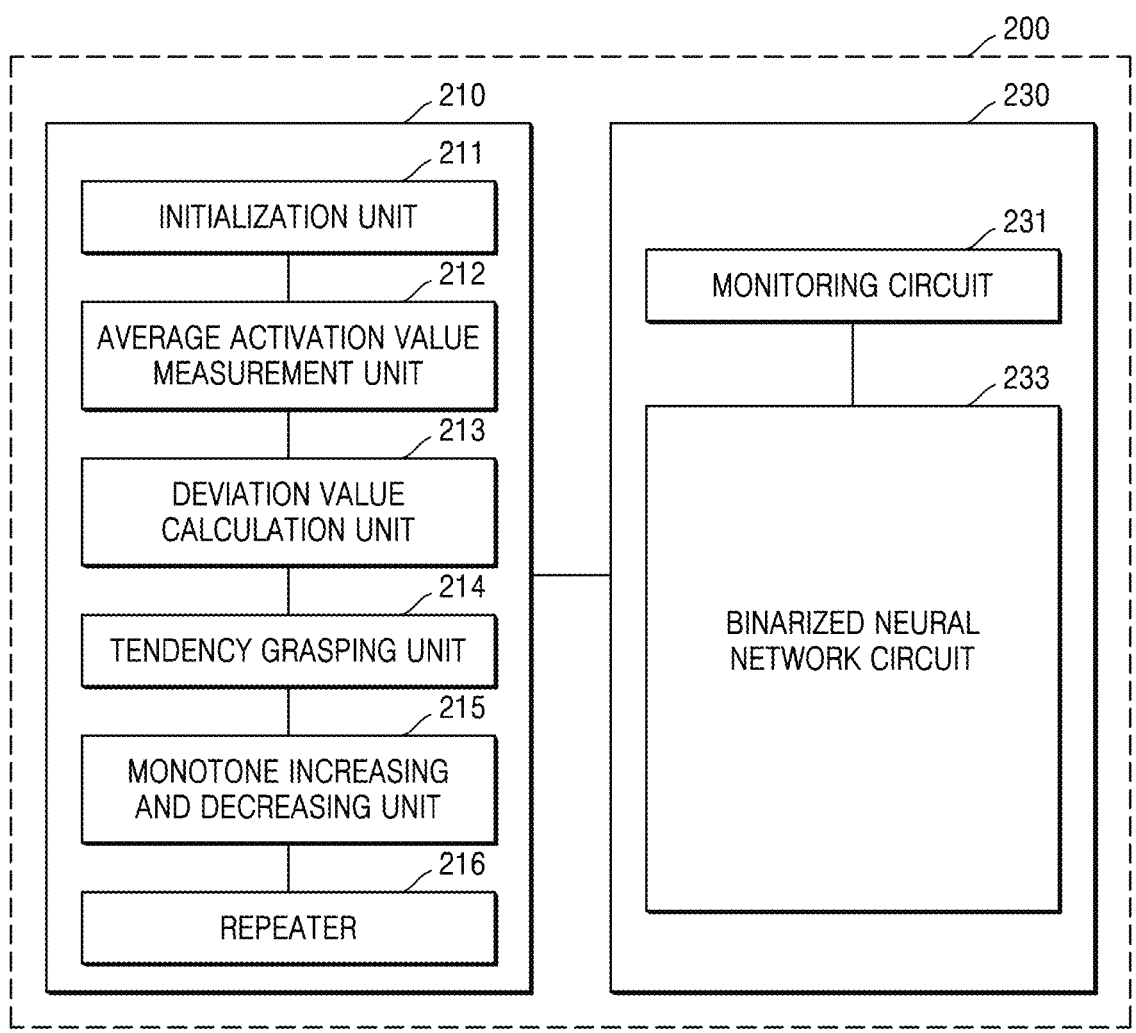
FIG. 2 is a block diagram of an example of a compensating system according to the present disclosure.

FIG. 2 is a block diagram of an example of a compensating system according to the present disclosure.

Referring to FIG. 2, an overall system 200 according to the present disclosure includes a process variation compensating system 210 (hereinafter referred to as a "compensating system") through activation value adjustment of a binarized neural network circuit, and a i\binarized neural network chip 230 (hereinafter referred to as "BNN chip") implanted into an analog circuit. More specifically, the compensating system 210 according to the present disclosure functions as a system that increases a recognition rate decreased due to process variation occurred in the BNN chip 230, and may include an initialization unit 211, an average activation value measurement unit 212, a deviation value calculation unit 213, a tendency grasping unit 214, a monotone increasing and decreasing unit 215, and a repeater 216.

In addition, the initialization unit 211, the average activation value measurement unit 212, the deviation value calculation unit 213, the tendency grasping unit 214, the monotone increasing and decreasing unit 215, and the repeater 216 included in the compensating system 210 according to the present disclosure may correspond to at least one processor, or may include at least one processor. Accordingly, the initialization unit 211, the average activation value measurement unit 212, the deviation value calculation unit 213, the tendency grasping unit 214, the monotone increasing and decreasing unit 215, and the repeater 216 may operate in a form included in other hardware devices such as microprocessors or general-purpose computer systems.

The initialization unit 211 performs initialization (initial programming) of synaptic weights and biases of neurons constituting a binarized neural network. Here, the initialization means to set a default value that is previously set and does not mean to change all values to 0. The initialization unit 211 may initialize a bias to an ATE placed outside the binarized neural network chip 230.

The average activation value measurement unit 212 receives training data and measures an average activation value obtained by quantifying how much an active output is output from a neuron constituting a binarized neural network during a predetermined time. Here, the training data may be data used to train the binarized neural network before the binarized neural network is implanted into an analog circuit.

The deviation value calculation unit 213 calculates a value of deviation between an average activation value measured by the average activation value measurement unit 212 and a reference average activation value. The deviation value calculation unit 213 performs a function of repeatedly calculating a value of deviation between the measured average activation value and the reference average activation value whenever the average activation value measured by the average activation value measurement unit 212 is changed. The deviation value calculation unit 213 receives the average activation value from the average activation value measurement unit 212, and if the received average activation value differs from the average activation value previously stored, the bias of the neuron is changed, and thus, the deviation value calculation unit 213 determines that the average activation value is changed and recalculate the deviation value. Here, meaning that a bias of a neuron is changed will be described in detail in the tendency grasping unit 214 to be described below.

The tendency grasping unit 214 changes the initialized bias at least once and grasps a tendency for the calculated deviation value to gradually decrease according to a direction in which the bias is changed. According to embodiments, the tendency grasping unit 214 may not change the actively initialized bias and may also change the bias according to an external input. The tendency grasping unit 214 changes the initialized bias to a different value at least once and grasps how the deviation value newly calculated by the deviation value calculation unit 213 increases or decreases according to the change.

For example, when the tendency grasping unit 214 gradually decreases the initialized bias over two times, if the deviation values recalculated by the deviation value calculation unit 213 gradually decrease, the tendency grasping unit 214 may grasp a logic in which decreasing a bias in the initialized bias leads to a decrease in a deviation value, as a tendency. As another example, when the tendency grasping unit 214 gradually increases the initialized bias over three times, if the deviation values recalculated by the deviation value calculation unit 213 are gradually increased, the tendency grasping unit 214 may grasp a logic in which decreasing a bias in the initialized bias leads to an increase in the deviation value as a tendency, and the present disclosure has a purpose in minimizing a decrease in a recognition rate of process variation by reducing a deviation between an average activation value measured from a neuron and the reference average activation value, and thus, the tendency grasping unit 214 may regard increasing a bias from the initialized bias as an undesirable implementation and discard the increased bias.

Although there may be a difference depending on a specific neuron circuit design method, a bias of the neurons of the respective layers constituting the artificial neural network has a certain expression range. In addition, an average activation value of neurons has monotone increasing and decreasing characteristics according to a value of a bias. The monotone increasing and decreasing characteristics indicate characteristics in which an average activation value of a neuron gradually increases as a bias value is gradually increased, and the average activation value of the neuron gradually decreases as the bias value is gradually decreased. Therefore, the present disclosure may minimize a decrease in performance of a recognition rate due to process variation of a binarized neural network configured with an analog circuit by using a monotone increasing and decreasing correlation between a bias value and an activation value.

Subsequently, the monotone increasing and decreasing unit 215 monotonically increases or monotonically decreases a bias of a neuron constituting a binarized neural network until the deviation value calculated by the deviation value calculation unit 213 becomes less than a predetermined reference deviation, based on a tendency grasped by the tendency grasping unit 214. The reference deviation is a value that is previously set in the monotone increasing and decreasing unit 215, and that the deviation value calculated by the deviation value calculation unit 213 is less than the reference deviation means that a decrease in a recognition rate of a neural network generated by implanting an artificial neural network into an analog circuit. recovers to a negligible level.

As an optional embodiment, the monotone increasing and decreasing unit 215 may monotonically increase or monotonically decrease a bias by repeating a binary search method, which will be described in detail through FIG. 3.

Subsequently, the BNN chip 230 of FIG. 2 may include the monitoring circuit 231 and the binarized neural network circuit 233.

The monitoring circuit 231 performs a function of receiving a value output from an artificial neural network implanted into an analog circuit and transmitting the value to the compensating system 210. The present disclosure has an advantage in that only the monitoring circuit 231 allowing a host computer or an ATE device located outside to check an output value of an internal neuron is additionally integrated into the BNN chip 230, thus, causing much less overhead than in the related art in which a training system is additionally inserted into the BNN chip 230 to cause a relatively large overhead. That is, according to the present disclosure, only by independently adding a circuit having little effect on an internal process of the BNN chip 230, a decrease in a recognition rate due to process variation of an analog binarized neural network circuit may recover to a higher level.

The binarized neural network circuit 233 is obtained by constituting the above-described binarized neural network with an analog circuit, and detailed description thereof will be omitted.

FIG. 3 is a diagram illustrating process in which a monotone increasing and decreasing unit monotonically increases or monotonically decreases a bias of a neuron using a monotone increasing and decreasing algorithm based on a binary search.

More specifically, FIG. 3 is a diagram illustrating a pseudocode describing a binary search-based algorithm used to set activation values of each neuron to be similar to an ideal value, a binarized neural network is assumed which recognizes a received image and performs image classification for outputting an estimated label, and an architecture is assumed which enables reprogramming by implementing a weight and a bias with resistive random access memory (ReRAM). In FIG. 3, the input value includes a dataset of an image and a chip having an artificial neural network implanted therein, the number of layers of the artificial neural network, and an ideal average activation value of each neuron constituting the artificial neural network, and the output value includes a chip in which biases of each neuron inside the chip are adjusted so that the average activation value reaches the ideal average activation value.

The algorithm according to FIG. 3 reprograms the ReRAM expressing a bias sequentially for each layer of the binarized neural network in a binary search method to adjust an activation value of a neuron. If an average activation value of an initial layer is changed due to characteristics of an artificial neural network using a feed forward structure, an average activation value in the subsequent layers also tends to change significantly due to influence thereof. Therefore, the present disclosure uses a manner in which an average activation value of neurons belonging to the initial layer is first matched to ideal values and average activation values of neurons belonging to the subsequent layers are sequentially adjusted (Line 1 of FIG. 3).

Biases of neurons in each layer have a constant expression range, and in FIG. 3, a plurality of ReRAM elements are used to express integers from −M to +M. An average activation value has monotonically increasing characteristics according to a value of the bias. According to the present disclosure, A bias value corresponding to an average activation value close to an ideal average activation value may be effectively found by applying a binary search method, based on monotone increasing and decreasing characteristics of an average activation value of a neuron for the change in bias described above (Lines 2 to 9 of FIG. 3).

In particular, the repeater 216 of FIG. 2 controls the average activation value measurement unit 212, the deviation value calculation unit 213, and the tendency grasping unit 214 so that a step of measuring an average activation value using the average activation value measurement unit 212, a step of calculating a value of deviation between the measured average activation value and a reference average activation value using the deviation value calculation unit 213, and a step of grasping a decrease tendency of the deviation value using the tendency grasping unit 214 are performed sequentially for each of the input layer, the hidden layer, and the output layer of the artificial neural network.

Figure 4:
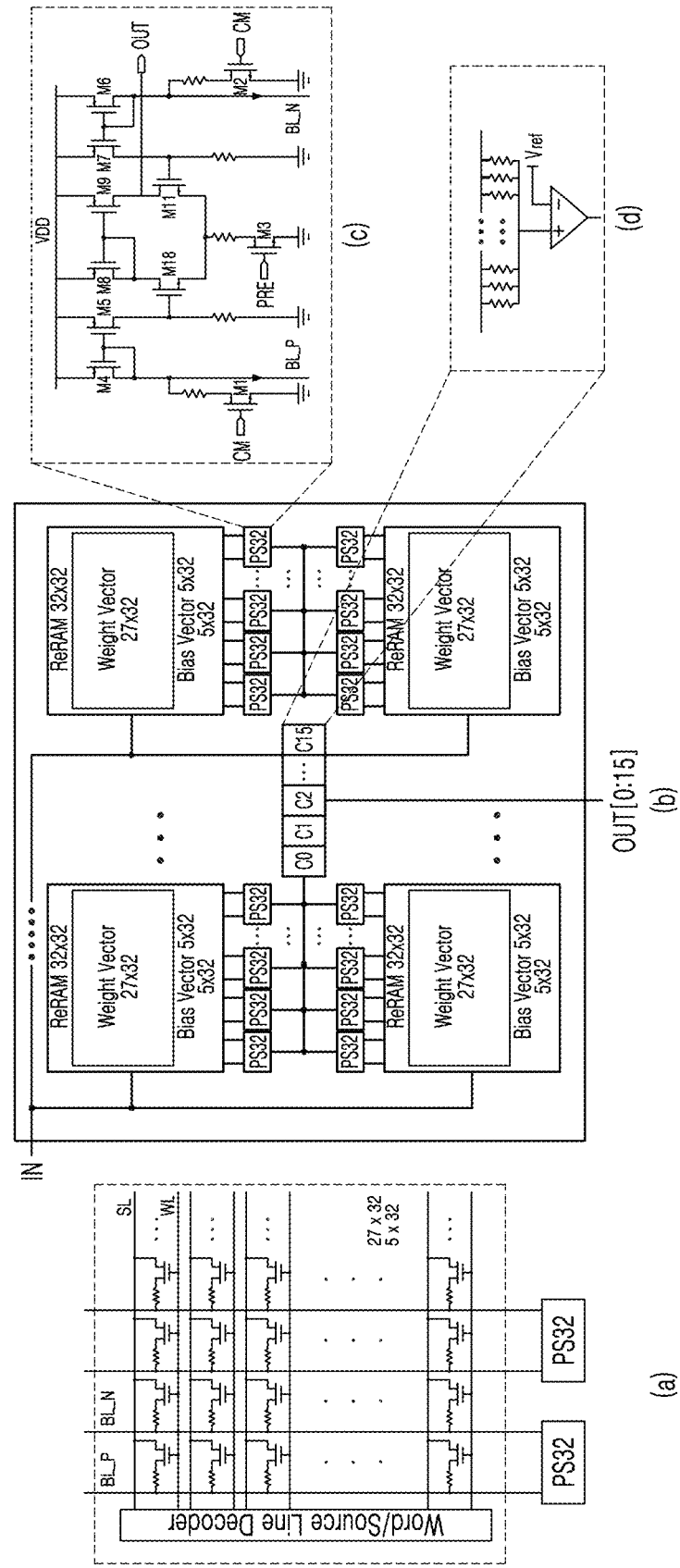
FIG. 4 is a diagram illustrating an example of an architecture in which a binarized neural network to which the present disclosure may be applied is designed by using an analog circuit.

FIG. 4 is a diagram illustrating an example of an architecture in which a binarized neural network to which the present disclosure may be applied is designed by using an analog circuit.

In FIG. 4, (a) illustrates a synaptic weight array, (b) illustrates a neuron sub-array, (c) illustrates a partial sum circuit, and (d) illustrates a comparator.

In FIG. 4, a plurality of synapses having a value of 0 or 1 exist in a neuron, and there is one bias expressed by an integer or a floating point. In the architecture of FIG. 4, several synaptic weights and biases are expressed by using a ReRAM crossbar with a 1-transistor-1-resistor (1T1R) structure. The weight has state values of −1, 1, and 0 (0 indicates that no weight is used), and two 1T1R cells per weight are used to express the state values. The bias has an integer value unlike a weight, and a plurality of cells are used to express the bias. In FIG. 4, each ReRAM is programmed to have a high resistance state (HRS) or a low resistance state (LRS), and is connected to a positive bit line BL_P or a negative bit line BL_N, respectively. An input value is transmitted through a word line (WL), a current flows through the ReRAM cell to add to BL_P or BL_N, the PS32 (PartialSum32) circuit subtracts the current flowing through BL_P and BL_N to convert into a voltage, and a subsequent comparator compares with a reference voltage Vref to output a 0V or a VDD voltage signal as an output value of a neuron. If a size of a ReRAM crossbar becomes too large, operation characteristics of a circuit are degraded, and thus, respective lines BL_P and BL_N are configured to be connected to maximum 32 ReRAM cells. When one neuron has more than 32 synapses, multiple PS32 circuits are connected in parallel through resistors to a positive terminal of a comparator to compare an average value of output values of the multiple PS32 circuits with the reference voltage Vref to determine an output value of a neuron. However, in FIG. 4, the ReRAM crossbar and the PS32 circuit are analog circuits, and thus, there is a problem in that characteristics are greatly changed due to process variation.

Figure 5:
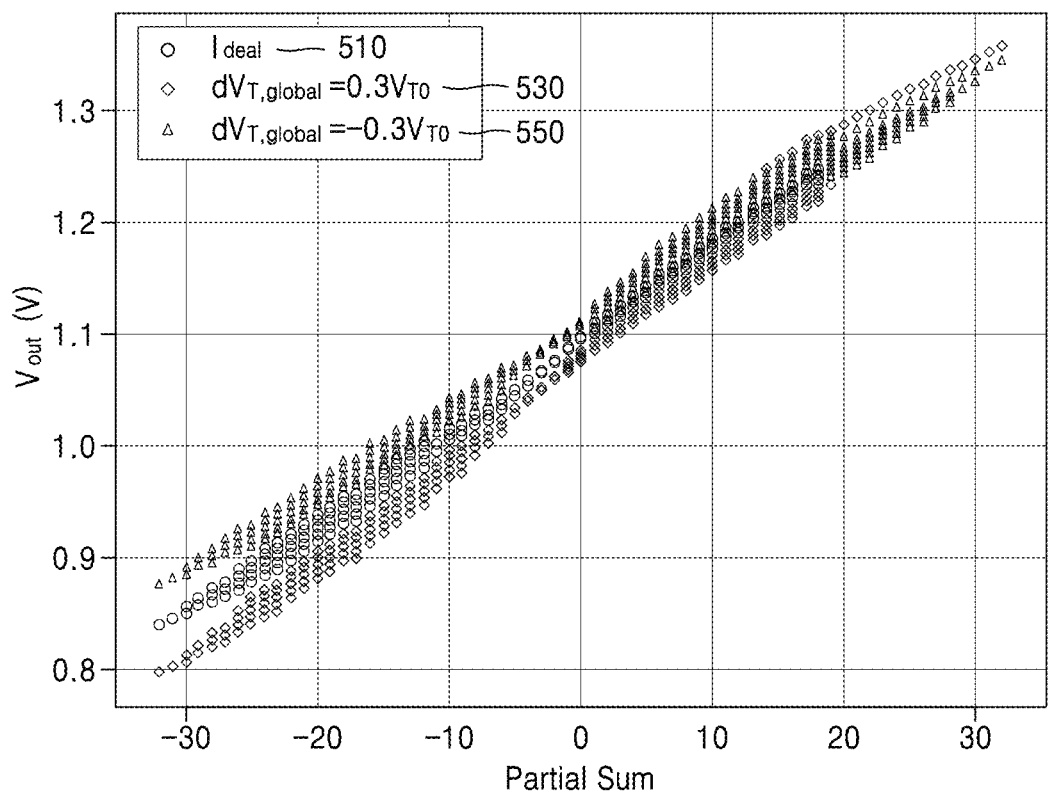
FIG. 5 is a diagram schematically illustrating a change in output voltage characteristics of a PS32 circuit in FIG. 4 according to process variation strength.

FIG. 5 is a diagram schematically illustrating a change in output voltage characteristic of the PS32 circuit in FIG. 4 according to process variation strength.

FIG. 5 illustrates a result in which a threshold voltage value of a transistor is changed by 30% to represent a process variation effect. According to FIG. 5, it may be confirmed that an output value of the PS32 circuit fluctuates greatly due to process variation. More specifically, FIG. 5 schematically illustrates the output value of the PS32 circuit that changes with a large vibration width around an ideal output value (ideal) of the PS32 circuit.

As illustrated in FIG. 5, a change in the output voltage characteristics of individual analog circuits due to process variation change an average activation value of each neuron in an artificial neural network, and the changed average activation value is accumulated for each layer of a neural network, resulting in a significantly larger malfunction of a neuron in a final stage and a significant decrease in performance of a recognition rate of the artificial neural network.

Figure 6:
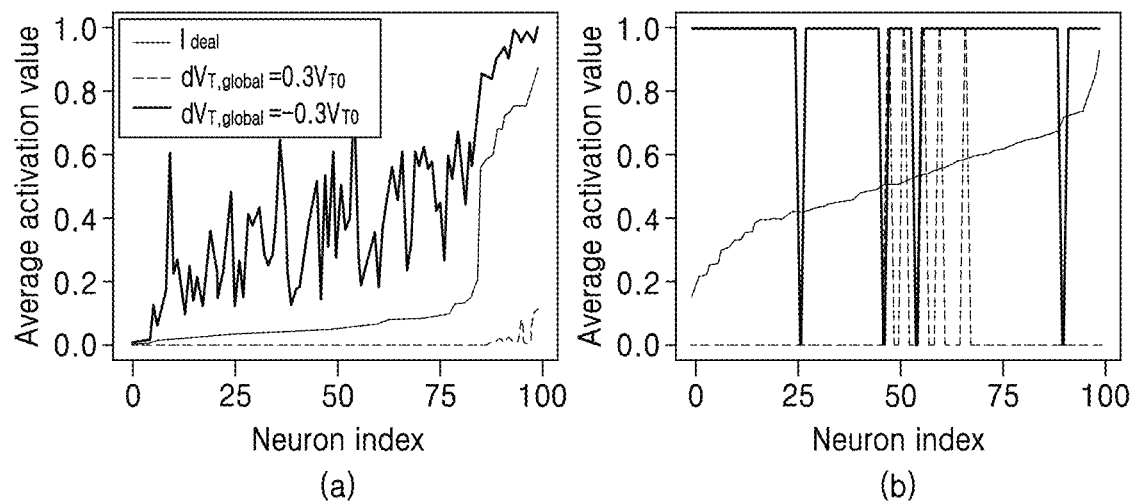
FIG. 6 is a diagram schematically illustrating an example of a change in an average activation value of neurons in an analog binarized neural network circuit due to process variation.

FIG. 6 is a diagram schematically illustrating an example of a change in an average activation value of a neuron of an analog binarized neural network circuit due to process variation.

(a) of FIG. 6 illustrates the average activation value in an initial layer of a binarized neural network configured by an analog circuit, and (b) of FIG. 6 illustrates the average activation value in a late layer of the binarized neural network configured by an analog circuit.

It may be seen from (a) of FIG. 6 that a deviation between an ideal average activation value of a neuron and the measured average activation value is not small, and from (b) of FIG. 6 that the deviation between the ideal average activation value of the neuron and the measured average activation value is more remarkable.

Figure 7:
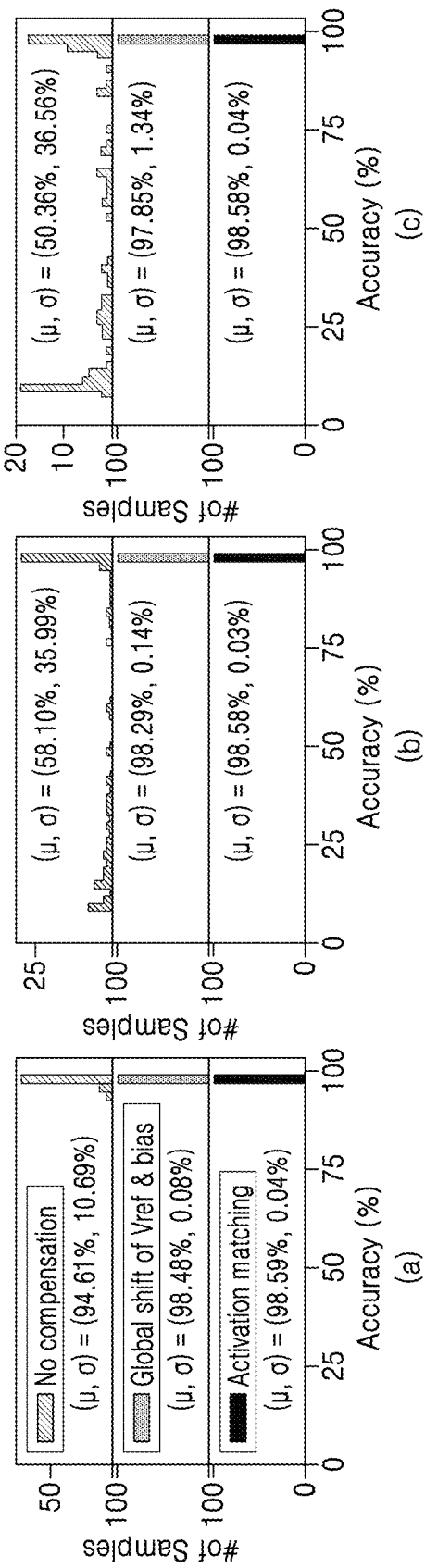
FIG. 7 and FIG. 8 are diagrams schematically illustrating a difference between recognition rates of a binarized neural network according to process variation strength.
Figure 8:
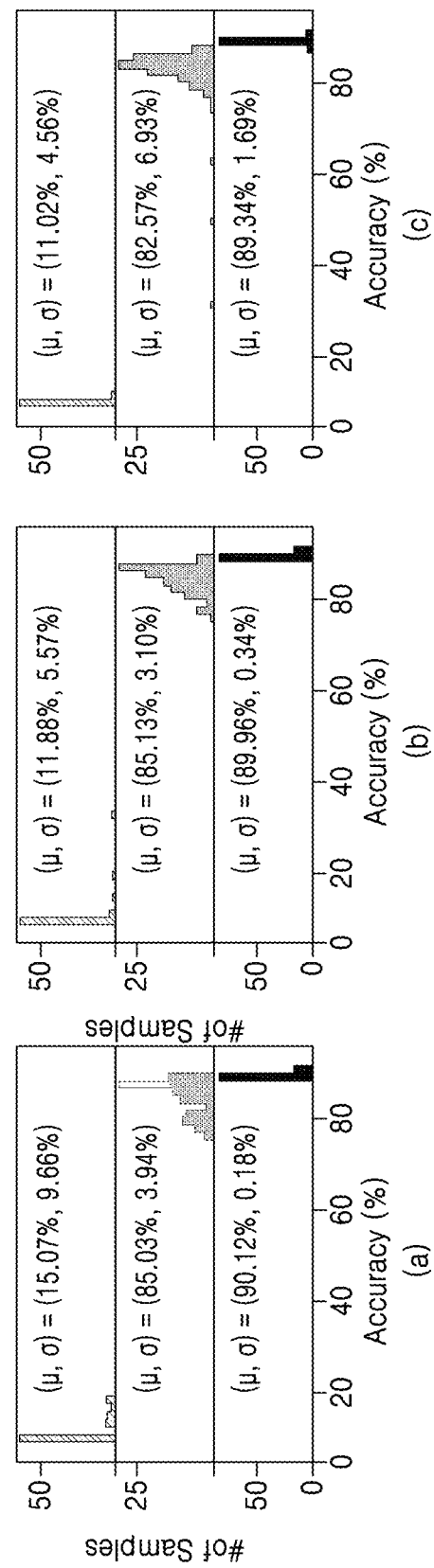

FIG. 7 and FIG. 8 are diagrams schematically illustrating a difference in recognition rates of a binarized neural network according to process variation strength.

FIG. 7 and FIG. 8 illustrate changes in a recognition rate performance distribution of the overall binarized neural network by simulating conditions with 10%, 30%, and 50% process variations, based on 100 sample chips that implement the binarized neural network with multi-layer perceptron (MLP) and a convolutional neural network (CNN) structures for MNIST and CIFAR-10 datasets, respectively.

First, (a) of FIG. 7 illustrates a result of a change in a recognition rate distribution in which a 10% process variation occurs when the binarized neural network is implemented with the MLP structure for the MNIST dataset, (b) of FIG. 7 illustrates a result of a change in a recognition rate distribution in which a 30% process variation occurs, and (c) of FIG. 7 illustrates a result of the change in a recognition rate distribution in which a 50% process variation occurs. Referring to (a) to (c) of FIG. 7, although the recognition rate distributions at the time when a process variation compensating method according to the present disclosure is applied are the same regardless of an occurrence rate of the process variation, it may be seen that the recognition rate distribution is randomly scattered according to the occurrence rate of the process variation before the process variation compensating method according to the present disclosure is applied.

Subsequently, (a) of FIG. 8 illustrates a result of a change in a recognition rate distribution in which a 10% process variation occurs when a binarized neural network is implemented with a CNN structure for a CIFAR-10 dataset, (b) of FIG. 8 illustrates a result of se change in a recognition rate distribution in which a 30% process variation occurs, and (c) of FIG. 8 illustrates a result of a change in a recognition rate distribution in which a 50% process variation occurs. Referring to (a) to (c) of FIG. 8, although the recognition rate distributions at the time when a process variation compensating method according to the present disclosure is applied are the same regardless of an occurrence rate of the process variation, it may be seen that the recognition rate distribution is randomly scattered according to the occurrence rate of the process variation before the process variation compensating method according to the present disclosure is applied.

When comparing FIG. 8 with FIG. 7, it may be seen that there is a difference in the application result of the process variation compensating method depending on the present disclosure according to the dataset and the structure of the artificial neural network, and in order to minimize a decrease in the recognition rate performance of the analog binarized neural network circuit, a reference average activation value previously set to be compared with the average activation value to be measured may be finely adjusted, or the number of changes in bias is sufficiently increased so that the tendency of the change in the recognition rate performance according to adjustment of a bias value may be grasped more accurately.

As described with reference to FIGS. 7 and 8, a degree of the process variation changes for each analog circuit (chip) to which the artificial neural network is implanted, and thus, correction in a design stage of the artificial neural network is limited, and a decrease in the recognition rate of the artificial neural network may be minimized by measuring the process variation and performing correction based on the process variation rate after the chip is manufactured according to the present disclosure. The present disclosure may use an activation value matching method for approaching an average activation value of each neuron to an ideal average activation value, and may recover the recognition rate performance of the binarized neural network in the analog chip so as to approach the recognition rate (MLP: 98.6% and CNN: 90.98%) in an ideal situation as illustrated in FIGS. 7 and 8.

Figure 9:
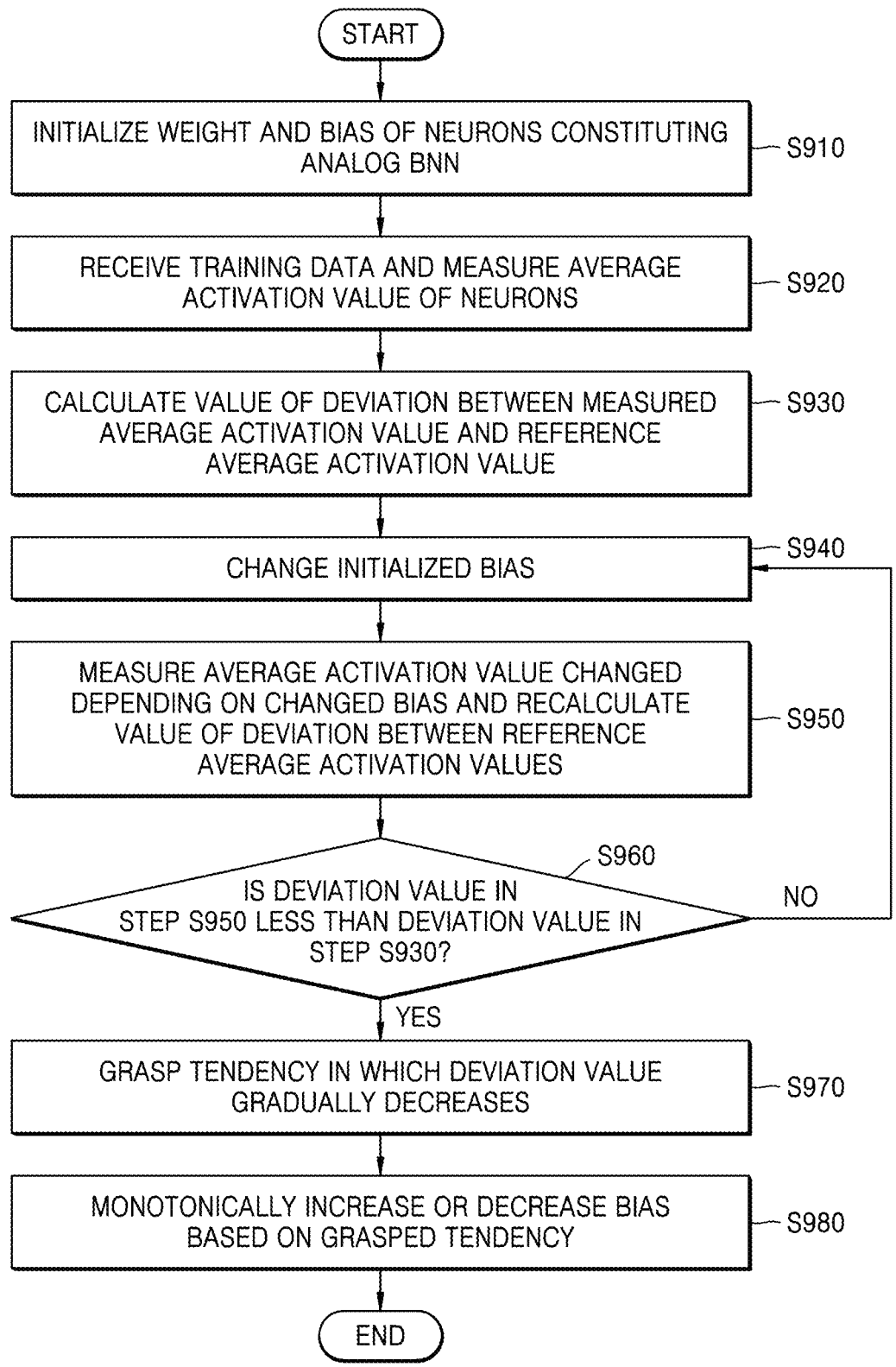
FIG. 9 is a flowchart illustrating an example of a compensating method according to the present disclosure.

FIG. 9 is a flowchart illustrating an example of a compensating method according to the present disclosure.

FIG. 9 may be implemented by the compensating system 210 in FIG. 2, and thus, description previously made with reference to FIG. 2 will be omitted, and hereinafter, description will be made with reference to FIG. 2.

The initialization unit 211 initializes weights and biases of neurons constituting an analog BNN (S910).

The average activation value measurement unit 212 receives training data and measures an average activation value of the neurons (S920). Here, the average activation value means a frequency at which a neuron output an active output, and the present disclosure targets a binarized neural network, and thus, the output of the neurons is 0 or 1. The average activation value may be calculated by sequentially applying all data included in a dataset used to train a binarized neural network to an artificial neural network, recording output values of each neuron each time, and then averaging the output values for each neuron. The value calculated in this way has a deviation from an activation value of a neuron theoretically calculated by process variation.

The deviation value calculation unit 213 calculates a value of deviation between the measured average activation value and the reference average activation value (S930).

The tendency grasping unit 214 changes the initialized bias (S940), measures an average activation value changed depending on the changed bias, and recalculates the value of deviation between the reference average activation values (S950).

The tendency grasping unit 214 determines whether or not the deviation value calculated in step S950 is less than the deviation value calculated in step S930 (S960), and if so, the tendency grasping unit 214 grasps a tendency for the deviation value to be gradually decreased (S970). If the deviation value calculated in step S950 is not less than the deviation value calculated in step S930, the repeater 216 returns to step S940 again to change the bias, and the tendency grasping unit 214 performs a control so that a new average activation value is measured and a deviation value is recalculated (S940 and S950).

The monotone increasing and decreasing unit 215 monotonically increases or monotonically decreases a bias based on the tendency grasped by the tendency grasping unit 214 (S980).

According to the present disclosure, although a binarized neural network is implemented as an analog circuit to cause a recognition rate performance to be decreased due to process variation, the decrease in recognition rate performance may be recovered up to an almost perfect level.

In addition, the present disclosure has versatility applicable to an analog circuit designed in various ways regardless of one specific design method.

The embodiment according to the present disclosure described above may be implemented in the form of a computer program that is executable through various configuration elements in a computer, and the computer program may be recorded in a computer-readable medium. At this time, the medium may include magnetic media such as a hard disk, a floppy disk, and a magnetic tape, an optical recording media such as CD-ROM and DVD, a magneto-optical medium such as a floptical disk, and a hardware device specially configured to store and execute program commands such as a RAM, a ROM, and a flash memory.

Meanwhile, the computer program may be specially designed and configured for the present disclosure or may be known and available to those skilled in the computer software field. Examples of computer programs may include not only machine language codes generated by a compiler, but also high-level language codes executable by a computer using an interpreter or the like.

Specific implementations described in the present disclosure are exemplary embodiments, and do not limit the scope of the present disclosure in any way. For the sake of brief specification, descriptions on electronic configurations, control systems, and software in the related art, and other functional aspects of the systems may be omitted. In addition, connection or connection members of the lines between the configuration elements illustrated in the drawings are examples of a functional connection and/or a physical connection or a circuit connection, and may be represented in the actual device as alternative or additional various functional connections, a physical connection, or a circuit connection. In addition, unless specifically described, such as "essential", "importantly", and so on, a configuration element may not be a necessary configuration element for application of the present disclosure.

In the specification (especially the claims) of the present disclosure, a term "above described" and an indication term similar thereto may be used for both singular and plural. In addition, when describing a range in the present disclosure, the range includes the disclosure to which individual values belonging to the range are applied (if there is no contrary description), which is the same that each individual value configuring the range is described in the detailed description of the disclosure. Finally, unless there is description on a clear order or contradictory description for steps configuring the method according to the present disclosure, the steps may be performed in a suitable order. The present disclosure is not limited to a description order of the above steps. Use of all examples or exemplary terms (for example, and so on) in the present disclosure is merely for describing the present disclosure in detail, and the scope of the present disclosure is not limited due to the examples or exemplary terms, unless defined by the claims. In addition, those skilled in the art may recognize that various modifications, combinations, and changes may be configured according to design conditions and factors within the scope of the appended claims or equivalents thereof.

The invention claimed is:

1. A method of process variation compensating through activation value adjustment of an analog binarized neural network (BNN) circuit in which a binarized neural network including an input layer, a hidden layer, and an output layer is implemented as an analog circuit, the method performed by a processor comprising:
   initializing synaptic weights and a biases of neurons constituting each layer of the binarized neural network;
   measuring a first average activation, calculating a first value of deviation between the measured first average activation value and a reference average activation value, the bias of the neurons of the input layer at least once to grasp a first tendency in which the calculated first deviation value gradually decreases, and letting the bias monotonically increase or monotonically decrease until the first deviation value becomes less than the preset reference deviation, based on the grasped first tendency;
   measuring a second average activation, calculating a second value of deviation between the measured second average activation value and a reference average activation value, the bias of the neurons of the input layer at least once to grasp a second tendency in which the calculated second deviation value gradually decreases, and letting the bias monotonically increase or monotonically decrease until the second deviation value becomes less than the preset reference deviation, based on the grasped second tendency;
   measuring a third average activation, calculating a third value of deviation between the measured third average activation value and a reference average activation value, the bias of the neurons of the input layer at least once to grasp a third tendency in which the calculated third deviation value gradually decreases, and letting the bias monotonically increase or monotonically decrease until the third deviation value becomes less than the preset reference deviation, based on the grasped third tendency; and
   causing a separate host computer or an automated test equipment (ATE) outside the binarized neural network circuit to output a recognition rate close to the ideal binary neural network recognition rate regardless of the process variation,
   wherein the first average activation is a numerical value of how much active output is output from the neurons constituting the input layer during a preset time using a training data,
   wherein the second average activation is a numerical value of how much active output is output from the neurons constituting the hidden layer during a preset time using a training data,
   wherein the third average activation is a numerical value of how much active output is output from the neurons constituting the output layer during a preset time using a training data.

2. The method of process variation compensating through activation value adjustment of an analog binarized neural network circuit of claim 1, wherein the initializing the synaptic weights and the biases of neurons constituting each layer of the binarized neural network comprises:
   initializing the biases using the ATE.

3. The method of process variation compensating through activation value adjustment of an analog binarized neural network circuit of claim 1,
   wherein the training data is data used to train the binarized neural network before being implanted into the circuit.

4. The method of process variation compensating through activation value adjustment of an analog binarized neural network circuit of claim 1, wherein the letting the bias of the neurons of the input layer, the hidden layer, and the output layer to monotonically increase or monotonically decrease comprises:
   letting the biases to monotonically increase or monotonically decrease by repeating a binary search method.

5. A computer-readable recording medium comprising a program for performing the method according to claim 1.

6. A system for process variation compensating through activation value adjustment of an analog binarized neural network (BNN) circuit in which a binarized neural network including an input layer, a hidden layer, and an output layer is implemented as an analog circuit, the system comprising:
   a processor configured to initialize synaptic weights and biases of neurons constituting each layer of the binarized neural network;
   measure an average activation value obtained by quantifying how much active output is output from the neurons constituting the binarized neural network for a preset time;
   receives training data and measures a first average activation value from the neurons constituting the input layer, calculates a first value of deviation between the measured first average activation value and the reference average activation value, changes the bias of the neurons of the input layer at least once to grasp a first tendency in which the calculated first deviation value gradually decreases, lets the bias monotonically increase or monotonically decrease until the first deviation value becomes less than the preset reference deviation, based on the grasped first tendency;
   wherein the processor receives training data and measures a second average activation value from the neurons constituting the input layer, calculates a second value of deviation between the measured second average activation value and the reference average activation value, changes the bias of the neurons of the input layer at least once to grasp a second tendency in which the calculated second deviation value gradually decreases, lets the bias monotonically increase or monotonically decrease until the second deviation value becomes less than the preset reference deviation, based on the grasped second tendency;
   receives training data and measures a third average activation value from the neurons constituting the input layer, calculates a third value of deviation between the measured third average activation value and the reference average activation value, changes the bias of the neurons of the input layer at least once to grasp a third tendency in which the calculated third deviation value gradually decreases, lets the bias monotonically increase or monotonically decrease until the third deviation value becomes less than the preset reference deviation, based on the grasped third tendency; and
   causes a separate host computer or an automated test equipment (ATE) outside the binarized neural network circuit to output a recognition rate close to the ideal binary neural network recognition rate regardless of the process variation.

7. The system for process variation compensating through activation value adjustment of an analog binarized neural network circuit of claim 6, wherein the processor initialize the biases using the ATE.

8. The system for process variation compensating through activation value adjustment of an analog binarized neural network circuit of claim 6,
   wherein the training data is data used to train the binarized neural network before being implanted into the circuit.

9. The system for process variation compensating through activation value adjustment of an analog binarized neural network circuit of claim 6, wherein the processor let the biases to monotonically increase or monotonically decrease by repeating a binary search method.

* * * * *